Figure 1:
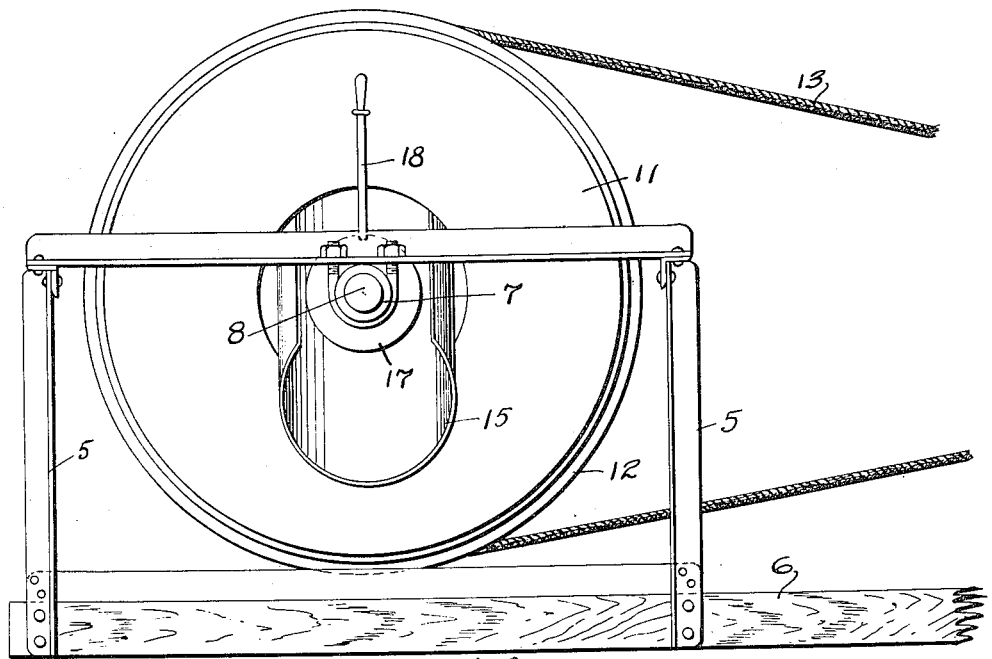

G. CARLSON.
MORTAR MIXER.
APPLICATION FILED DEC. 17, 1910.

1,060,319.

Patented Apr. 29, 1913.
2 SHEETS—SHEET 1.

WITNESSES

INVENTOR
Gustave Carlson
BY
ATTORNEY

G. CARLSON.
MORTAR MIXER.
APPLICATION FILED DEC. 17, 1910.

1,060,319.

Patented Apr. 29, 1913.

2 SHEETS—SHEET 2.

WITNESSES
Geo. A. Senior
A. W. Gardes

INVENTOR
Gustave Carlson
BY
Victor J. Evans
ATTORNEY

UNITED STATES PATENT OFFICE.

GUSTAVE CARLSON, OF PLAINFIELD, NEW JERSEY, ASSIGNOR OF ONE-HALF TO WILLIAM VAN R. WHITALL, OF PLAINFIELD, NEW JERSEY.

MORTAR-MIXER.

1,060,319.

Specification of Letters Patent. Patented Apr. 29, 1913.

Application filed December 17, 1910. Serial No. 597,832.

*To all whom it may concern:*

Be it known that I, GUSTAVE CARLSON, a subject of the King of Sweden, residing at Plainfield, in the county of Union and State of New Jersey, have invented new and useful Improvements in Mortar-Mixers, of which the following is a specification.

This invention relates to concrete and mortar mixers, and its object is to provide a cylinder for mixing the mortar and have it carry a spout into which may be delivered the contents of the cylinder so that a certain amount may be delivered through the spout, and when the desired amount has been delivered the spout may be so turned as to shut off the supply while the mixer continues to revolve, as will be more fully described in the following specification, set forth in the claim and illustrated in the drawings, wherein,—

Figure 2:
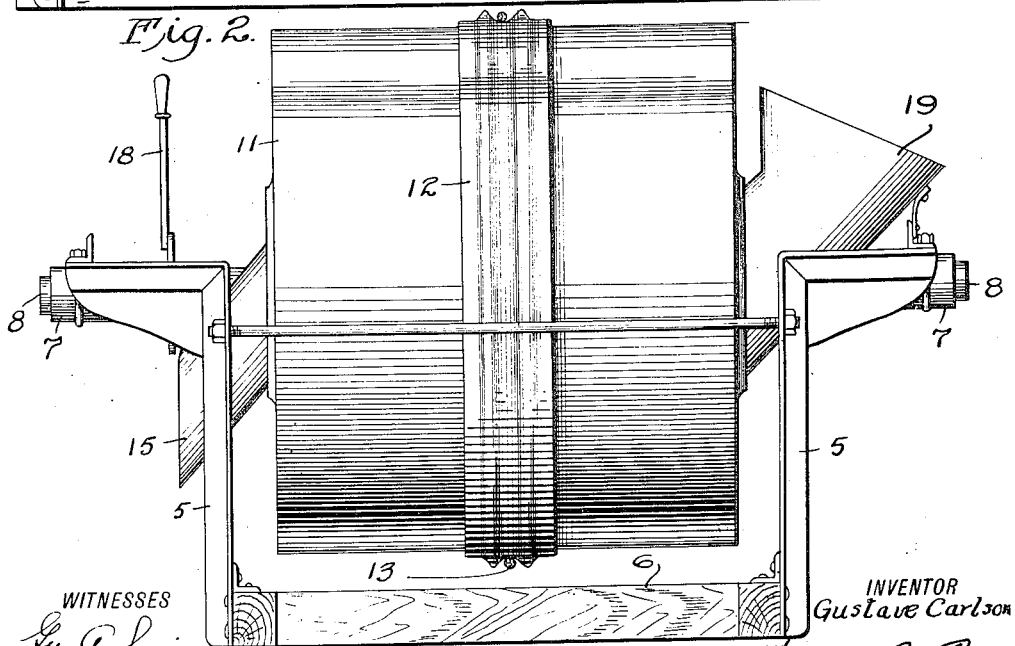
Figure 3:
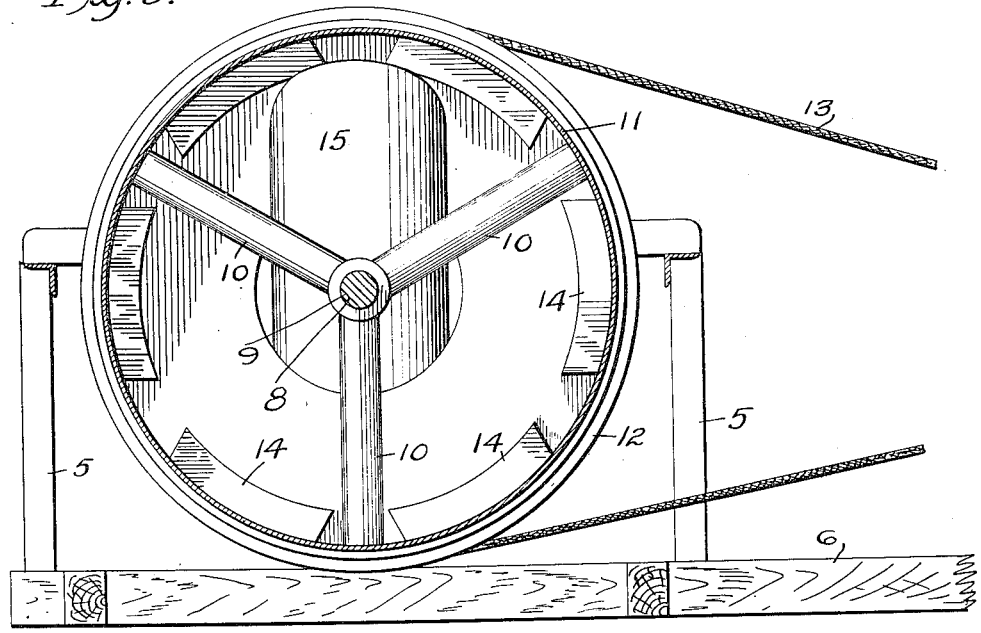
Figure 4:
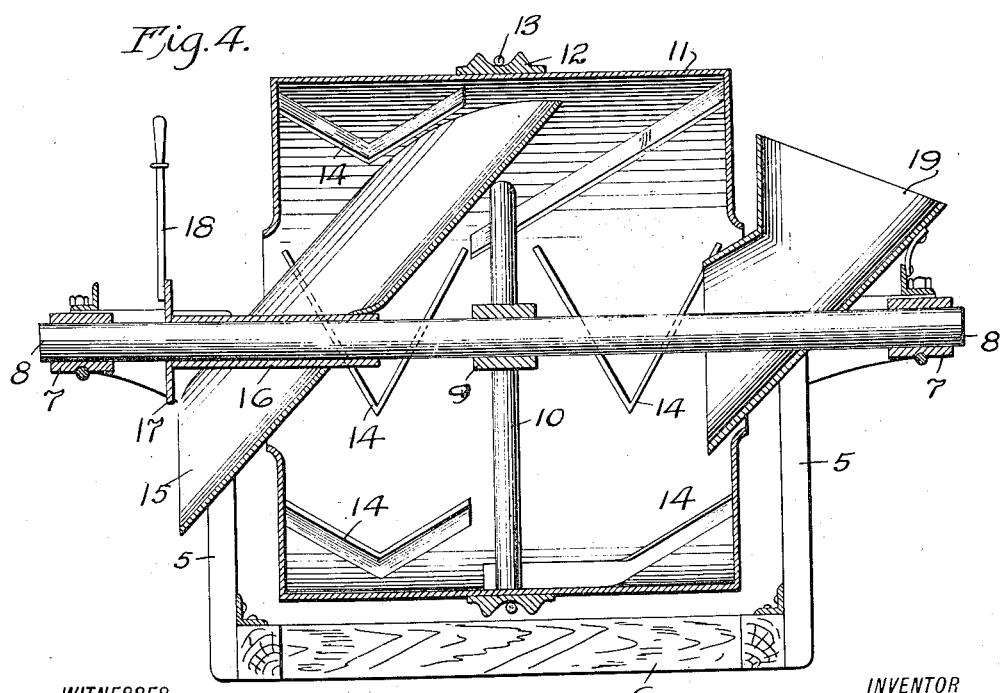

Figure 1 is a front view of the mixer. Fig. 2 is a side elevation of same. Fig. 3 is a cross sectional view looking toward the spout. Fig. 4 is a longitudinal sectional view.

The mixer is mounted on a frame 5 of any desired shape or construction, and has a substantial base 6 preferably of wood. The frame carries the journal boxes 7 in which rotates a shaft 8. This shaft 8 has secured to it the hub 9 from which radiate spokes 10 which carry the cylinder 11. This cylinder may be provided with the grooved ring 12 for the driving band 13 and it is open at each end. Within the cylinder are buckets 14 which are adapted to carry the material up the sides of the cylinder so as to deliver it into the chute or spout which is secured to a sleeve 16 mounted on the shaft 8. It will be seen that the buckets 14 are substantially uniform at the discharge end of the cylinder, while at the feed end they may be made in various shapes as their object at this end is simply to agitate and mix the material. The sleeve 16 is provided at its outer end with a flange 17 carrying a handle 18. All of the views show the side in its position to deliver the mortar at the front of the machine, but when it is desired to render this spout inoperative and stop the delivery of the material, the sleeve 16 is rotated reversing the direction of the spout 15 and preventing the delivery of the material into it. At the rear end of the cylinder is a chute 19 into which the component parts of the mortar is thrown for the purpose of mixing same.

It is obvious that the device may be otherwise modified and the parts differently arranged without departing from the essential feature above shown. It is also evident that this invention need not be confined to the mixing of concrete or mortar but may be used for many other purposes where plastic materials are to be mixed such as fertilizers, grout, mortar and where a ready means for delivering same may be required.

What I claim as new and desire to secure by Letters Patent, is,—

In a device of the class described, a support, a horizontal shaft journaled in said support, a hollow drum surrounding said shaft and centrally attached thereto, said drum provided with end openings, a sleeve member rotatably and slidably mounted upon said shaft and extending into the drum, means whereby said sleeve may be operated, and a discharge chute provided with a central opening for the reception of said sleeve member, said chute being fixedly attached to said member in an inclined position with respect thereto and extending into the drum.

In testimony whereof I affix my signature in presence of two witnesses.

GUSTAVE CARLSON.

Witnesses:
JAMES F. DUHAMEL,
CHARLES LA RUE.